United States Patent
Harmsen et al.

[11] 3,926,508
[45] Dec. 16, 1975

[54] MANUFACTURING A COLD LIGHT MIRROR BY EVAPORATING ZNS AND SIO ALTERNATELY IN AN $O_2$ ATMOSPHERE

[75] Inventors: Jan Willem Harmsen; Augustinus Petrus Jozephus Swinkels, both of Emmasingel, Netherlands

[73] Assignee: U.S. Philips Corporation, New York, N.Y.

[22] Filed: Dec. 4, 1972

[21] Appl. No.: 311,937

[30] Foreign Application Priority Data
Dec. 7, 1971    Netherlands................ 7116766

[52] U.S. Cl. ............... 350/296; 350/311; 427/162
[51] Int. Cl.² ............... B29D 11/00; B44D 5/06; C03C 17/00; C03C 17/12
[58] Field of Search... 117/33.3, 35 V, 35 R, 106 R, 117/ 106 A; 350/311, 296

[56] References Cited
UNITED STATES PATENTS

| | | | |
|---|---|---|---|
| 2,281,474 | 4/1942 | Cartwright et al. | 117/106 R |
| 2,456,899 | 12/1948 | Strong | 117/35 V |
| 2,519,722 | 8/1950 | Turner | 117/35 V |
| 2,700,323 | 1/1955 | Schroder | 117/35 X |
| 3,248,256 | 4/1966 | Budo et al. | 117/33.3 |

Primary Examiner—Roland E. Martin, Jr.
Assistant Examiner—Richard L. Schilling
Attorney, Agent, or Firm—Frank R. Trifari; Norman N. Spain

[57] ABSTRACT

A method of manufacturing a concave cold light mirror by coating a curved surface of a transparent support with a plurality of ¼ λ -layers of alternately ZnS and SiO by means of vapour deposition in an oxygen atmosphere at the pressure at which the vapour jets are dispersed between the surface to be coated by vapour deposition and the vapour sources.

2 Claims, No Drawings

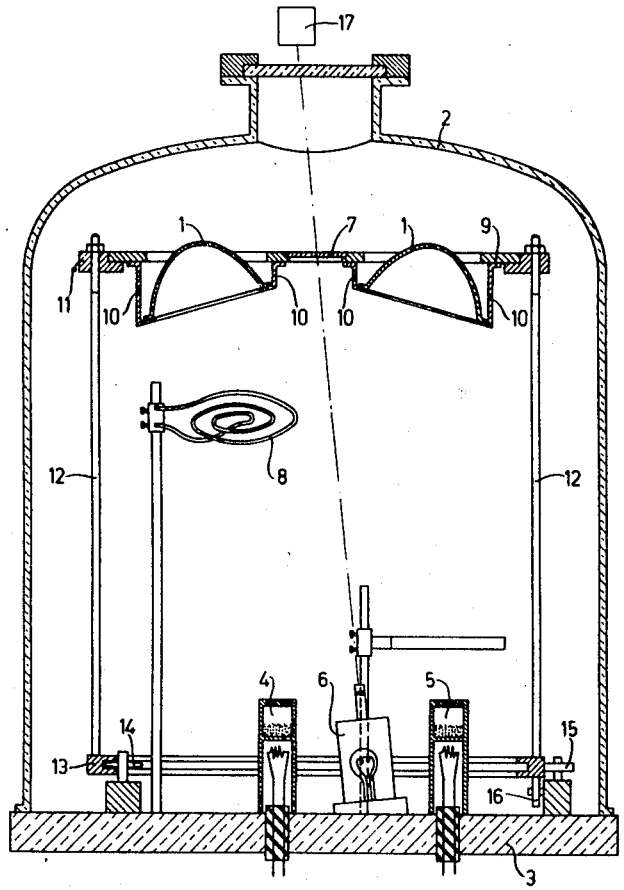

U.S. Patent    Dec. 16, 1975    3,926,508
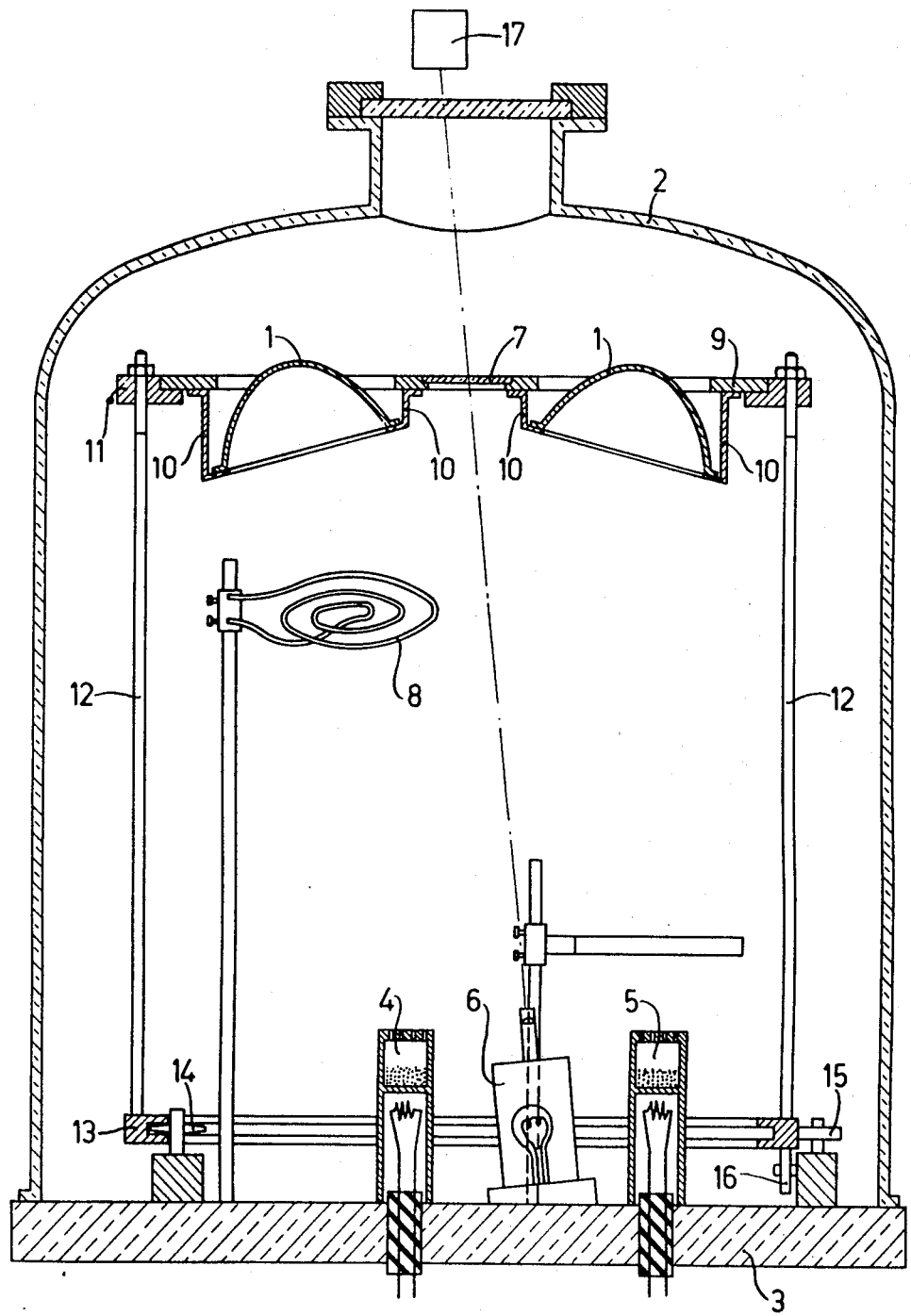

MANUFACTURING A COLD LIGHT MIRROR BY EVAPORATING ZNS AND SIO ALTERNATELY IN AN O₂ ATMOSPHERE

The invention relates to a method of manufacturing a cold light mirror by coating a curved surface of a transparent support with a plurality of ¼ λ-layers of alternately a material having a relatively high refractive index and a material having a relatively low refractive index by means of vapour deposition in an atmosphere having a pressure such that the vapour jet is dispersed in the space between the vapour source and the surface to be coated.

Parabolically formed cold light mirrors of this kind are known as such. They are used, for example, in combination with projection lamps. Part of the thermal radiation of the lamp is passed by the cold light mirror and thus does not reach the projected film or the lantern slide. Lamps are also known which consist of parts of moulded glass in which a cup-shaped part formed in accordance with a rotational paraboloid is internally coated with a cold light mirror. The filament is in the vicinity of the focus of the mirror. The assembly is closed by a transparent face plate sealed to the cup-shaped part. Lamps of this kind are used, for example, for shop-window lighting. Since part of the thermal radiation leaves the lamp in a backward direction there is less danger that the articles on which the light is incident reach a too high temperature.

In a known method of manufacturing cold light mirrors on a curved surface the vapour deposition atmosphere consists of a rare gas having a pressure in the order of $10^{-3}$ Torr. In this atmosphere alternately ¼ λ-layers of ZnS and ¼ λ-layers of MgF₂ are provided. After a sufficient number of layers is provided by means of vapour deposition the mirror is subjected to a thermal treatment so as to enhance the adhesion of the layers mutually and to the transparent support. Due to the relatively high rare gas pressure the vapour jet is dispersed between the surface to be coated and the vapour source. In case of vapour deposition of a surface in a high vacuum the thickness of the vapour-deposited layer is dependent on the angle of incidence of the vapour jet and on the distance between the surface and the vapour source. For a curved surface this has the result that the vapour-deposited layer is not equal in thickness throughout. This drawback is obviated in case of vapour deposition under circumstances such that the vapour jet is dispersed.

It is found in practice that the adhesion of the layers mutually and to the transparent support is generally sufficient for use in a lamp such as in the previously mentioned lamp consisting of moulded glass parts. For uses in which the mirror is in contact with the atmosphere such as is the case, for example, for use in combination lamps, the adhesion of the layers mutually and to the transparent support is not always found to be sufficient. This becomes particularly manifest when the mirrors are tested under tropical conditions.

An object of the invention is to provide a method with which concave cold light mirrors can be obtained which do not have these drawbacks.

The method according to the invention is characterized in that the curved surface is provided alternately with layers of a relatively high refractive index and of a relatively low refractive index by means of vapour deposition with alternately ZnS and SiO in an oxygen atmosphere at a pressure at which the vapour jets are dispersed between the surface to be coated by vapour-deposition and the vapour sources.

In a high vacuum in which the distance between the surface to be coated by vapour deposition and the vapour deposition source is generally smaller than the mean free path of the vapour molecules, the vapour source can be compared with a light source: the vapour molecules are rectilinearly propagated resulting in what may be referred to as vapour jets.

At the pressure used in the method according to the invention the distance between the vapour sources and the surface to be coated by vapour deposition is larger than the mean free path of the vapour molecules.

Generally the oxygen pressure is on the order of $10^{-3}$ Torr. When evaporating SiO in an oxygen atmosphere the vapour-deposited layer obtained therewith consists of SiO₂. When evaporating ZnS (refractive index 2.2) oxidation probably likewise occurs while forming ZnSO₄ (refractive index 1.6) but his oxidation is found to occur on a too small scale to cause difficulties of an optical nature while on the other hand it is found that the adhesion is enhanced. Zinc sulphide is a relatively soft material, whereas silicon dioxide is a relatively hard material. It is not common practice to combine relatively hard materials with relatively soft materials in the art of manufacturing interference filters in the manner as is effected according to the invention. When both materials are vapour-deposited in an oxygen atmosphere a more resistant interference filter is found to be obtained. The transparent support may consist of glass, quartz glass or a synthetic material.

The method according to the invention will be described in detail with reference to the accompanying drawing, the sole FIGURE of which diagrammatically shows a vapour deposition device and an embodiment of the method according to the invention.

A vacuum bell jar 2 secured to a base plate 3 accommodates a holder which can rotate about an axis going through the middle of the jar, two vapour deposition crucibles 4 and 5, a system consisting of a light source 6 and a flat glass plate 7, a photoelectric cell 17 and an apparatus with which the photoelectric current supplied by this cell can be measured and with which the vapour deposition can be observed and checked photoelectrically and a glow discharge filament 8 for cleaning the glass cups 1 which must be provided with a cold light mirror.

The holder consists of a metal plate 9 accommodating apertures for the cups 1 and the flat glass plate 7. The cups are fixed with the aid of the supports 10 in the aperture in the metal plate 9 intended for this purpose. The distance between the cups and the vapour deposition sources is 25 cms.

The plate 9 engages a metal ring 11 which is secured by means of a plurality of bars 12 to a metal ring 13. The metal ring can be brought to a rotating movement with the aid of a drive wheel 14 which is driven by an electric motor not shown and the ring 13 is supported in three areas by a guide wheel system consisting of two wheels 15 and 16.

After the cups 1 are mounted in the metal plate 9 and the glass plate 7 is provided, the bell jar is evacuated to a pressure in the order of $10^{-2}$ Torr whereafter the valve between the diffusion pump and the bell jar is closed. Subsequently argon is admitted to the evacuated bell jar through a needle valve in such a quantity that a discharge of approximately 2200 V and approximately 60 mA is produced in the bell jar. During the glow discharge the holder system rotates. Alternatively oxygen instead of argon may be admitted.

The glow discharge is maintained for 10 minutes. Subsequently the bell jar is evacuated to approximately $10^{-3}$ Torr. A continuous stream of oxygen is then admitted through a needle valve and this in such a quantity that the pressure in the bell jar is maintained at $0.7 \times 10^{-3}$ Torr. During the entire vapour deposition process this pressure is maintained constant as much as possible by regulating the stream of oxygen through the needle valve and by slowing down the speed of the pump.

While the holder is rotating, material is vapourdeposited alternately from crucible 4 and from crucible 5, namely firstly a total of ten ¼ λ-layers in which λ is 5900 A and subsequently ten ¼ λ-layers in which λ is 4800 A. The vapour deposition process is photoelectrically observed so as to check the layer thickness. Cold light mirrors obtained by the method according to the invention are very satisfactory in practice. The adhesion of the layers is such that even in case of long-time use under tropical conditions the layers do not come loose.

What is claimed is:

1. A method of manufacturing a concave cold light mirror by coating a curved surface of a transparent support with a plurality of ¼ λ-layers of alternately a material having a relatively high refractive index and a material having a relatively low refractive index by means of vapour deposition in an atmosphere having a pressure such that the vapour jet is dispersed in the space between the vapour source and the surface to be coated, characterized in that a curved surface is alternately provided with layers having a relatively high refractive index and a relatively low refractive index by means of vapour deposition with alternately ZnS and SiO in an oxygen atmosphere at a pressure at which the vapour jets are dispersed between the surface to be coated by vapour deposition and the vapour sources said pressure being about $10^{-3}$ Torr.

2. Concave cold light mirrors obtained by the method as claimed in claim 1.

* * * * *